(12) United States Patent
Ghislain

(10) Patent No.: US 7,227,104 B2
(45) Date of Patent: Jun. 5, 2007

(54) THERMAL CONDUCTIVITY MASK FOR PRODUCING PATTERNS

(75) Inventor: Lucien P. Ghislain, Daly City, CA (US)

(73) Assignee: Lithoware, Inc, Millbrae, CA (US)

( * ) Notice: Subject to any disclaimer, the term of this patent is extended or adjusted under 35 U.S.C. 154(b) by 85 days.

(21) Appl. No.: 11/075,174

(22) Filed: Mar. 7, 2005

(65) Prior Publication Data

US 2005/0274263 A1  Dec. 15, 2005

Related U.S. Application Data

(60) Provisional application No. 60/579,728, filed on Jun. 14, 2004.

(51) Int. Cl.
*H05B 3/68* (2006.01)
*H05B 3/06* (2006.01)

(52) U.S. Cl. .................................. 219/450.1; 219/524

(58) Field of Classification Search ............. 219/443.1, 219/445.1, 446.1, 448.11, 448.12, 450.1, 219/451.1, 524; 99/326, 327, 328, 331, 332, 99/372, 376–381
See application file for complete search history.

(56) References Cited

U.S. PATENT DOCUMENTS

| | | | | |
|---|---|---|---|---|
| 3,852,569 A | * | 12/1974 | Potvin | 219/525 |
| 3,998,145 A | * | 12/1976 | Maisch | 99/339 |
| 5,642,659 A | | 7/1997 | Sesona et al. | 99/376 |
| 5,937,742 A | * | 8/1999 | Steeb et al. | 99/375 |
| D414,075 S | | 9/1999 | Mishan | D7/410 |
| 6,433,312 B1 | * | 8/2002 | Chen | 219/386 |

* cited by examiner

*Primary Examiner*—Sang Y. Paik

(57) ABSTRACT

A device for producing patterns includes a thermal conductivity mask that has at least one cavity, a thin film positioned adjacent to the mask, and a heater which may be any convenient heat source. In a preferred embodiment, the thermal conductivity mask includes a pattern of cavities, holes or openings, and the thin film in held in tension over the mask. The cavities, holes or openings in the mask selectively control the flow of heat because they contain material having lower thermal conductivity than the material of the mask. The device may be used to transfer a pattern or image to a pancake, among other things.

32 Claims, 8 Drawing Sheets

THERMAL CONDUCTIVITY MASK FOR PRODUCING PATTERNS

RELATED APPLICATIONS

This application claims priority under 35 U.S.C. §119(e) to provisional application No. 60/579,728 filed on Jun. 14, 2004 titled "Thermal Conductivity Mask For Producing Patterns And Picture Pancake Maker."

FIELD

The invention relates to the use of a thermal conductivity mask to produce patterns in a sample.

A preferred embodiment of the invention is a pancake maker, more particularly a pancake maker that patterns a picture or decorative pattern into the pancake as part of the cooking process

BACKGROUND

A conventional pancake maker includes a heated cooking surface and may be simply a frying pan heated, for example, by burning gas, wood, coal, or an electric element. The cooking surface is typically made of a thermally conductive material, for example a metal, and may include a non-stick coating, typically polytetrafluoroethylene (Teflon).

Conventional pancake makers do not provide for patterning a picture into the pancake as part of the cooking process.

Waffle makers which produce an embossed die pattern, usually a square, rectangular or similar periodic grid are well known. Also, a pancake or waffle maker die face forming an embossed decorative pattern is presented in U.S. Design Patent D414,075 to Edward L. Mishan.

A pancake and egg cooker that produces an embossed decorative pattern is also known in the prior art, see U.S. Pat. No. 5,642,659 issued Jul. 1, 1997 to Albert J. Sesona and Ernesto E. Blanco. In this case, the embossed pattern is equivalent to the die pattern of the waffle maker, but with varying shapes replacing the periodic grid.

The limitations of the prior art patterned pancake cookers include:

1. Slow cooking rate, due in part to the need for heating both sides of the cooker separately by flipping the cooker over to alternate between the two sides, see U.S. Pat. No. 5,642,659.

2. Limited selection of patterns. The commercially available pancake maker includes only one pattern, the United States Flag, and does not provide convenient and low cost interchangeable patterns.

3. Low pattern quality, as measured by resolution, the smallest feature size that can be reliably printed, and contrast, the difference in color between light and dark regions.

3a. The resolution is limited because small features, especially narrow and deep depressions, will not be reproduced in the cooked pancake due to batter sticking to the bottom and sides of the depression in the cooking surface. Thus prior art pancake cookers can emboss simple textual messages and graphics such as "Good Morning" and a "Happy Face", but cannot produce fine detail required by more appealing decorative patterns.

3b. Contrast is limited because the pattern is produced by embossing, a process where depressions in the cooking surface yield protrusions, or bumps in the surface of the cooked pancake. Since the entire surface of the pancake is exposed to the cooking surface for a fixed time, the entire area of the embossed pattern is cooked to a uniform color. There is no way to control the color in the pattern.

SUMMARY

Objects of the present invention include:

To provide a thermal conductivity mask for producing patterns by selectively conducting heat from a heat source to an object to be patterned. The thermal conductivity mask may be used to pattern any surface, edible or inedible, that exhibits a change in measurable properties upon exposure to heat.

To provide a thermal conductivity mask that is capable of producing patterns with high pattern quality as measured by the criteria of uniformity, resolution and contrast.

To provide a thermal conductivity mask that is capable of producing patterns with controlled color from dark to light and including all intermediate shades.

To provide a thermal conductivity mask that can be produced at low cost and can include patterns on two surfaces (both sides).

To provide a picture pancake maker that includes a heater, a cooking surface comprising a thermal conductivity mask, and thin film, and a tension ring comprising a holding ring and a tension mounts.

To provide a picture pancake maker for use with an external heat source that includes a cooking surface comprising a thermal conductivity mask, and thin film, and a tension ring comprising a holding ring and a tension mounts.

To provide a pancake maker that can produce a pattern or picture on a pancake as part of the cooking process, where the pattern or picture is selected for decorative purposes to increase the appeal of a food item for the consumer.

Advantages of the thermal conductivity mask include:

1. A short cooking time due to the use of a high thermal conductivity material for the bulk of the mask and the capability to operate over a wide range of temperatures.

2. Thermal conductivity masks that can be patterned on two sides, so the user can change the pattern simply by turning over the mask to expose a second side.

3. A wide variety of interchangeable masks, achieved by having available a variety of mask plates each with a different pattern (on one or both sides) and providing masks that can be produced at low cost so the user can select from a variety of patterns, then easily and in a short time set up the picture pancake maker to cook pancakes with the selected pattern.

4. High pattern quality, as measured by uniformity, resolution and contrast.

a. The design and methods of the invention provide for high pattern resolution, capable of producing fine details in the surface of the cooked pancake.

b. In addition the design and methods of the invention provide for high contrast by controlling the rate of heat flow, so the picture or pattern can have at least two colors, typically white or beige (more raw) and brown or golden (more cooked).

c. Further, the invention provides for a continuous color scale ranging between light (white or beige) and dark (brown or golden) and including all shades in between.

The thermal conductivity mask for producing patterns may be used to pattern a wide variety of samples, both edible and inedible. In a preferred embodiment, the thermal conductivity mask is used to pattern the surface of a pancake, hotcake, crepe or similar edible item during the cooking process. The starting material is a liquid batter, typically beige or milky white in color (but any color is possible, by use of edible dyes, for example), the liquid batter is poured onto a cooking surface preheated to a cooking temperature. After a period of time the batter solidifies and changes color, typically to a shade of brown ranging from light brown to dark brown or even black, (again, any color is possible). At this point the pancake is flipped to cook the second side, after a second period of time the pancake is removed from the cooking surface.

The preferred embodiment of the picture pancake maker comprises: a heater and a cooking surface. The heater is typically an electric element, but may be gas, wood burning or any heat source capable of reaching cooking temperatures (in the range 100–1000 deg. F.), and operates to heat and cook the pancake batter placed on the cooking surface. The cooking surface includes a thermally conductive plate or mask (usually metal such as copper, iron or aluminum) patterned with cavities, holes or openings, and a thin-film of non-stick material (for example, polytetrafluoroethylene) stretched over the thermal conductivity mask. The mask openings, cavities, holes or depressions define a volume of low thermal conductivity material (usually air) surrounded by high thermal conductivity material (usually metal). The mask controls the flow of heat to the cooking surface, this in turn controls the rate of cooking of a food item on the cooking surface, which can also control the time required for the food item to change color (usually from lighter to darker, typically white to brown for a pancake). The mask typically has a diameter equal to or greater than the desired size of the pancake.

The thin film, typically polytetrafluoroethylene, is in contact with and supported by the mask and covers the holes, depressions, cavities and/or openings in the mask to form an enclosed volume of low thermal conductivity material, typically air. In addition, there may be cavities positioned in the thermally conductive plate below the surface, as shown in FIG. 7.

In the preferred embodiment, the thin film is held in tension and stretched over the thermally conductive plate by a tension ring. The tension ring surrounds the cooking surface, holds the thin film and provides tension or pre-load, for example by use of mechanical springs, to maintain uniform contact (free of wrinkles) with the thermally conductive mask over the entire operating temperature range. This overcomes the problem of differential thermal expansion, where the thin film has a higher thermal expansion coefficient than the mask. In an alternate embodiment, the thin film may be directly bonded to the mask. The bonding process is designed to produce a thin film free of wrinkles, bubbles, other deformations and in uniform contact with the mask at the operating temperature.

The cooking surface is heated by the heater and operates to selectively cook the pancake batter according to a predetermined pattern. It is well known that pancake batter changes color as part of the cooking process, the raw batter is typically white or beige in color, the cooked batter is brown or golden—the shade of brown growing increasingly dark as the cooking time and temperature increase. Pancake batter placed on the cooking surface is cooked more rapidly in areas where the thin film contacts the metal mask, typically turning brown in color, and cooked more slowly in areas where the thin film covers a hole, depression, cavity and/or opening (i.e. a void), typically remaining lighter in color (closer to the color of the raw batter). By optimizing the size, shape, position and material of the cavities, the size and material of the thermally conductive plate, the size and material of the thin film, very fine detail can be patterned into the food item. Thus the picture pancake maker patterns a picture by controlling thermal conductivity to selectively cook the pancake batter The food items that may be patterned by the picture pancake maker include, thick (American-style hotcakes or pancakes), thin (French crepes), burritos, tacos, quesadillas, chips, cookies, breads, cakes, pastries, essentially any food item that exhibits a change of color upon exposure to heat.

DESCRIPTION

Figure 1:
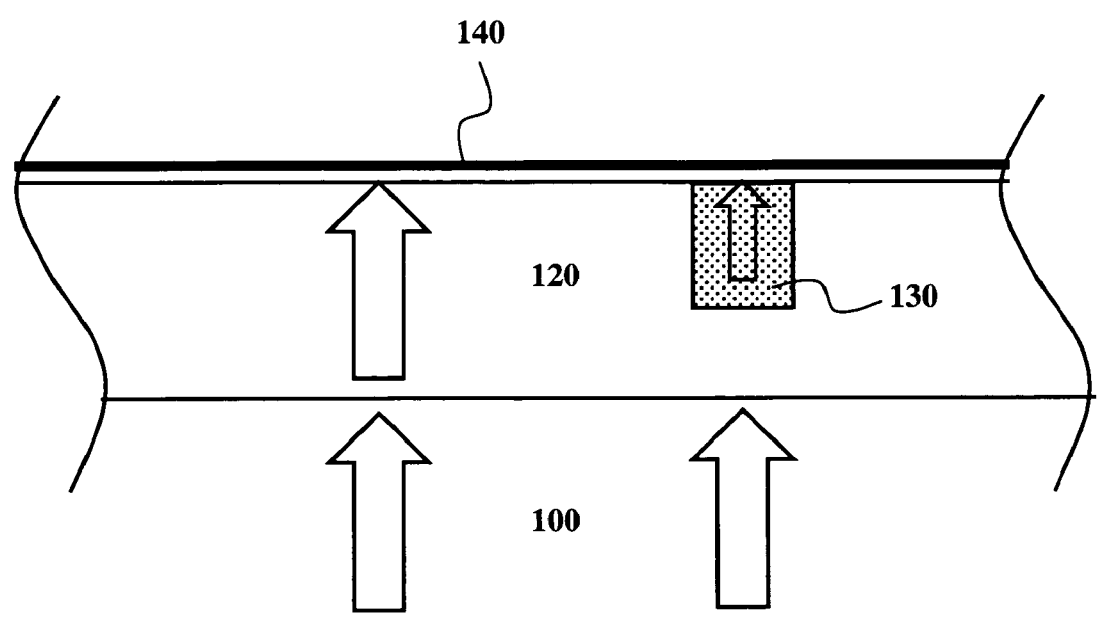
FIG. 1 is a schematic diagram a preferred embodiment of the thermal conductivity mask for producing patterns.

In FIG. 1 is shown a schematic of the thermal conductivity mask for producing patterns including a heater 100, heating a mask 120, that has a cavity 130, (where one or more cavities form a pattern), and a thin film 140. Arrows indicate the direction and the size of the arrow indicates the magnitude of heat flow. It can be seen that the rate of heat flow is reduced by the cavity 130, because the material of the cavity has lower thermal conductivity than the material of the mask 120.

The thermal conductivity mask can produce a pattern on a surface by selectively conducting heat because properties or characteristics, such as the color, of a surface can change with exposure to heat. The cavities 130, may be holes or openings (i.e. voids) in the mask that form air-pockets (cavities filled with air), having a thermal conductivity much lower than the material of the mask 140, which is typically produced from a metal having good thermal conductivity, for example aluminum or copper.

In the simplest of terms, the discipline of heat transfer is concerned with only two things: temperature, and the flow of heat. Temperature represents the amount of thermal energy available, whereas heat flow represents the movement of thermal energy from place to place. On a microscopic scale, thermal energy is related to the kinetic energy of molecules. The greater a material's temperature, the greater the thermal agitation of its constituent molecules (manifested both in linear motion and vibrational modes). It is natural for regions containing greater molecular kinetic energy to pass this energy to regions with less kinetic energy.

Several material properties serve to modulate the heat transferred between two regions at differing temperatures. Examples include thermal conductivities, specific heats, material densities, fluid velocities, fluid viscosities, surface emissivities, and more. Taken together, these properties serve to make the solution of many heat transfer problems an involved process.

Heat transfer mechanisms can be grouped into 3 broad categories:

Conduction: Regions with greater molecular kinetic energy will pass their thermal energy to regions with less molecular energy through direct molecular collisions, a process known as conduction. In metals, a significant portion of the transported thermal energy is also carried by conduction-band electrons.

Convection: When heat conducts into a static fluid it leads to a local volumetric expansion. As a result of gravity-induced pressure gradients, the expanded fluid parcel becomes buoyant and displaces, thereby transporting heat by fluid motion (i.e. convection) in addition to conduction. Such heat-induced fluid motion in initially static fluids is known as free convection.

For cases where the fluid is already in motion, heat conducted into the fluid will be transported away chiefly by fluid convection. These cases, known as forced convection, require a pressure gradient to drive the fluid motion, as opposed to a gravity gradient to induce motion through buoyancy.

Radiation: All materials radiate thermal energy in amounts determined by their temperature, where the energy is carried by photons of light in the infrared and visible portions of the electromagnetic spectrum. When temperatures are uniform, the radiative flux between objects is in equilibrium and no net thermal energy is exchanged. The balance is upset when temperatures are not uniform, and thermal energy is transported from surfaces of higher to surfaces of lower temperature.

In the case of cooking a pancake, in a region of the mask 140 having high thermal conductivity cooking occurs rapidly. However, in a region of the mask near a cavity 130, where the thermal conductivity is lower, cooking occurs more slowly. Since cooking produces a change in color with the cooked regions generally darker and the uncooked regions lighter, by selectively patterning pockets, cavities or regions of low thermal conductivity it is possible pattern or print a picture during the cooking process.

The thermal conductivity mask 120, can also be thought of as a heat flow controller or heat filter that modulates the rate of heat flow according to a predetermined pattern.

As an analogy, consider Ohms law which states that the flow of electric current (electric charge per unit time) i measured in amperes, given a voltage source that sets up an electric potential difference V measured in volts (due to an electric field E), depends on the resistance R measured in Ohms, according to the relation:

$$V=iR$$

It is also sometimes helpful to define an electrical conductance $G=i/R$; then $i=GV$.

The thermal conductivity is defined as an intrinsic physical property of a substance, describing its ability to conduct heat as a consequence of molecular motion. It can be defined by reference to the Newton law of cooling:

$$H=-K(T/N)$$

where K is the thermal conductivity; H the rate of heat conduction across a surface per unit area and per unit time, measured in units of Watts/cm$^2$; and T/N the temperature gradient normal to the surface, measured as deg. C/cm. Thus the thermal conductivity can be measured as Watts/(deg. C. cm$^2$/cm). It is also called heat conductivity, coefficient of thermal conduction, coefficient of heat conduction.

To complete the analogy to Ohms law for the case of heat flow, the electrical conductance G may be replaced by the thermal conductivity K, the electric potential V replaced by the temperature gradient T/N, and the electric current replaced by the rate of heat conduction H.

Once again it may be helpful to consider the reciprocal of the thermal conductance, the thermal resistance. In this way it can be seen that the cavities or air-pockets can be thought of as thermal resistors controlling the rate of heat flow, and the flow of heat (energy per unit time) given a heat source that sets up a temperature difference, depends on the thermal resistance.

For purposes of illustration, the patterning process of the present invention can be compared to the well-known process of branding cattle. The branding process uses a branding iron that is formed from metal shaped into a pattern or logo attached to a handle so the metal pattern can be heated in a wood-burning fire. The animal to be branded is caught and constrained, a cowboy or farm-hand takes the hot iron from the fire by the handle and presses the hot metal pattern against the animal's hindquarters. The result is a burn pattern that is used as identification and as a deterrent to poachers.

The pattern produced by a thermal conductivity mask can be significantly more complex and include more detail than the simple logo of a branding iron. Thus, it is important to define the quality of the pattern and there are three parameters that provide a quantitative measure of print or pattern quality: contrast, edge sharpness (or resolution) and uniformity.

Contrast is typically measured on a grey-scale and is the difference between the darkest and brightest regions of an image. For example, in a digitized image with an 8-bit grey scale the pixel values would range from 0 to 255 and contrast would be defined by the grey-level value of the darkest region and the brightest region of a pattern:

Contrast=(bright region−dark region)/dark region

In the case of electronic imaging, for example with a CCD sensor, maximum contrast is limited by noise sources, for example photon shot noise or noise due to electronic gain, but this is beyond the scope of our discussion.

In the case of a pattern cooked into a pancake, contrast is determined by the difference in color between the most raw (typically lightest) and most cooked (typically darkest) regions of the pattern. If the pancake is not cooked long enough, contrast will be poor because the darkest regions of the pattern are not dark enough. If the pancake is cooked too long, contrast may also be poor because, though the darkest regions of the pattern are very dark and heat leakage may darken the pattern areas that were intended to remain lighter in color. In addition the pancake may be unpalatable, look burnt and smell bad. By optimizing the design of the mask and the cooking parameters (such as time and temperature) it is possible to optimize pattern contrast.

Figure 2:
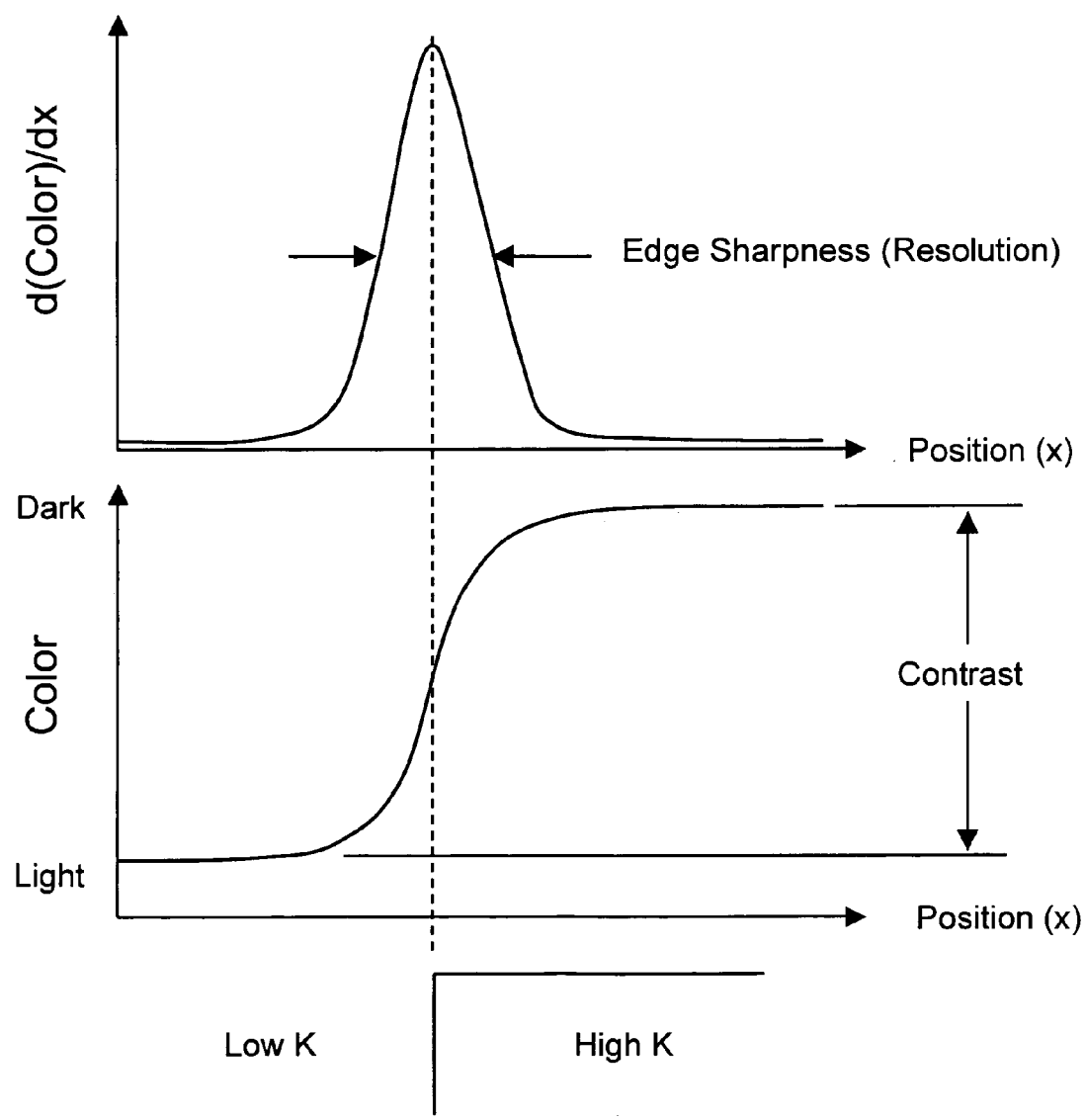
FIG. 2 shows the definition of contrast, and edge sharpness (resolution) of the pattern.

As shown in FIG. 2, edge sharpness determines whether fine detail can be produced in the pattern and can be measured by the profile of an edge of the pattern where there is a sharp transition from light to dark, shown as a step in the lower graph of FIG. 2. The width of the transition is a measure of the size of the smallest feature than can be produced in the picture. By calculating the slope or derivative of the lower graph, one obtains the peak in the upper graph. The width of this peak is a measure of the edge sharpness or resolution.

Finally, uniformity is simply the variation of contrast and edge sharpness over the entire patterned area, in this case the diameter of the mask. We would like the image to be produced with high contrast and edge sharpness over the entire area of the pancake without any deterioration of pattern quality in some area, for example at the edge of the mask. This depends on the uniformity of the heater 100, the uniformity of the mask 120, the thin film 140, the presence of isolated air-pockets between heater, mask and thin film and so forth.

The thermal conductivity mask achieves high print or pattern quality by utilizing the large difference between thermal conductivities of the cavity 130, (typically air) and the mask 120 (typically a metal). Referring once again to FIG. 1, a thin film 140 serves as the upper surface of an air-pocket 130, with the side and bottom surfaces of the air-pocket defined by the hole or opening in the metal mask 120. If the hole or opening goes through the mask, the bottom surface may be defined by a surface on the heater, 100. The volume of air positioned adjacent to the thin film surface during cooking has very low thermal conductivity, typically 0.00026 Watts/(cm² deg.C./cm). The ratio of the thermal conductivity (K) of the metal plate and the air pocket is then (in the case of an aluminum alloy 1100):

$$K_{Aluminum}/K_{Air} \approx 2.1/0.00026 \approx 8,000$$

In the case of a metal plate made of copper this ratio improves further to:

$$K_{Copper}/K_{Air} \approx 3.85/0.00026 \approx 14,800$$

Figure 7A:
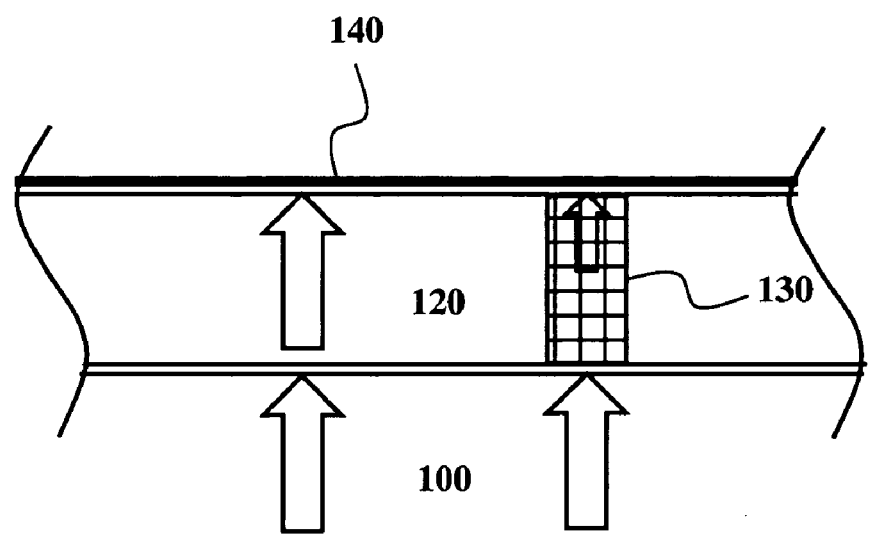
FIGS. 7(a–d) are schematic diagrams of alternate embodiments of the thermal conductivity mask for the producing patterns.

It is this large difference in thermal conductivity that enables the printing of a pattern or graphic with high pattern quality. It should be noted that, in addition to air, any low thermal conductivity material suitable for the range of operating temperatures may be used to form the cavity 130, for example glass, ceramic, porous materials, low thermal conductivity epoxy. If the cavity were filled with a gas of low thermal conductivity (for example carbon dioxide at 0.00017 Watts/cm² deg.C./m), or even sealed under vacuum (which has a thermal conductivity less than air at atmospheric pressure) the thermal conductivity ratio would increase, and pattern quality would improve, as shown schematically in FIG. 7a. In addition, a higher thermal conductivity material for the mask 120, would similarly improve pattern quality.

Figure 3:
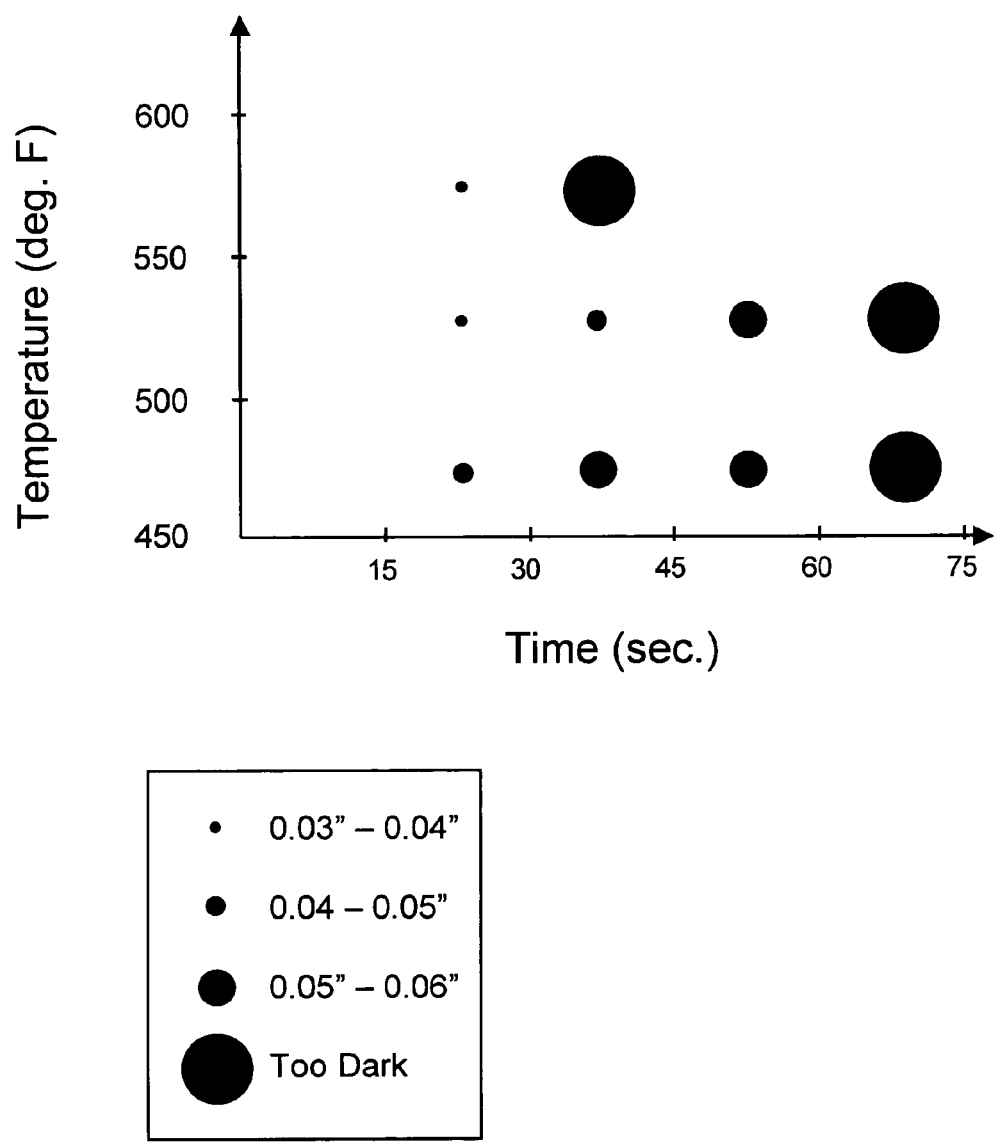
FIG. 3 is a graph of the smallest visible features size in the pattern plotted versus cooking temperature and cooking time.

The graph in FIG. 3 shows the smallest feature detected by the naked eye on pancakes cooked over a range of temperatures, from 450 to 600 degrees F., and with a range of cooking times from 15 to 75 seconds, using a thermal conductivity mask according to the preferred embodiment. Each circle corresponds to a feature size according to the legend included with the graph. The general trend is for smaller features to be visible at shorter cooking times and higher cooking temperatures. Specifically, for cooking times in the range 15–30 sec, and cooking temperatures in the range 500–600 deg. F., it is possible to see pattern features in the size range 0.030" to 0.040" diameter. This result would suggest that features smaller than 0.030" diameter could be patterned at cooking times shorter than 15 seconds and cooking temperatures greater than 550 deg. F. This is just one example that serves as a guide or starting point, and actual user results will vary with the properties of the mask, pattern, thin film, heater, pancake batter, ambient pressure and more.

The general trend whereby smaller features print with lower quality can be understood by comparing cavity volume with surface area. Consider a cavity in the shape of a cylinder filled with air. The cylinder has radius r and height h. The volume is $\pi r^2 h$ and the total area of the side walls of the cylinder is $2\pi rh$. Heat flow into the cylinder increases with the total surface area of the side-walls. Heat flow along the axis of the cylinder is determined by the volume of air. So the ratio of surface area to volume measures the rate of heat flow into the cavity relative to heat flow out of the cavity. For the cylinder, this ratio is:

$$\text{surface area/volume} = (2\pi rh/\pi r^2 h) = 2/r$$

This ratio increases as radius of the cylinder decreases, so the air in a small cavity will heat up faster, tending to reduce pattern contrast, and cavities with larger radius will produce higher pattern contrast. Small cavities are more 'leaky' and small pattern features will tend to disappear as the cooking time increases.

In addition, the general trend where smaller pattern features are visible at shorter cooking times and higher cooking temperatures can be understood simply as reducing the effect of "heat leaks". At long cooking times, small heat leaks (low thermal conductivity pathways) can contribute significantly to the total heat energy delivered to the pancake. At short cooking times, small heat leaks contribute less and the total heat energy delivered is dominated by the high thermal conductivity pathways, namely from the heater 100, to the mask 120, and directly through the thin film 140 to the pancake avoiding the cavities 130.

From this analysis it is apparent that pattern edge sharpness (or resolution) can be improved by operating at higher cooking temperatures and shorter cooking times. Other ways to improve pattern sharpness include:

1. Higher thermal conductivity mask
2. Reduced thin film thickness (increases heat flow to pancake, reduces lateral heat flow into cavity).
3. Direct bonding of the thin film to the mask (improves thermal conductivity from mask to pancake).
4. Reduced thermal conductivity in the cavity (eg. replace air with carbon dioxide or vacuum).

The heater 100, may operate in a conductive mode or in a radiative mode. In the conductive case, which is the preferred embodiment, a resistive element of an electric heater carries electric current, dissipates heat and raises the resistive element temperature. The resistive element is in good thermal contact with a heater plate that conducts and distributes the heat to provide a uniform temperature over the heater plate surface. In this case heat energy is defined by the motion of molecules, and heat moves or diffuses through a material at a flow rate measured by the thermal conductivity. Heat is conducted from the heater plate surface through the mask and the thin film to the surface to be patterned.

In the radiative case, an alternate embodiment, a resistive element carries electric current which dissipates heat and raises the resistive element temperature, as before, but in addition, when the temperature is sufficiently high, the resistive element begins to glow red, indicating that it is emitting heat in the form of infra-red radiation. This infra-red light is emitted in all directions and propagates along 'line-of-sight' through a transparent medium (usually air) to be absorbed and reflected at an absorbing or opaque surface.

Some of the infra-red light is absorbed and reflected by the thermal conductivity mask, and absorbed by the thin film and the pancake surface, raising their temperature. By selectively blocking the infra-red radiation, the mask can produce a pattern on the pancake surface. Holes or openings in the mask transmit heat to the pancake surface, turning it brown. The solid regions of the mask, block the heat keeping the pancake surface more raw or lighter in color.

In addition, there is a competing effect determined by the amount of light absorbed and reflected by the mask. If the mask is highly reflective in the infra-red then most of the heat is reflected, very little is absorbed and the mask effectively blocks the flow of heat to the pancake surface. However, if the mask is less reflective, then some of the heat is absorbed by the mask and carried to the pancake surface. This tends to reduce the contrast of the pancake picture.

Figure 4:
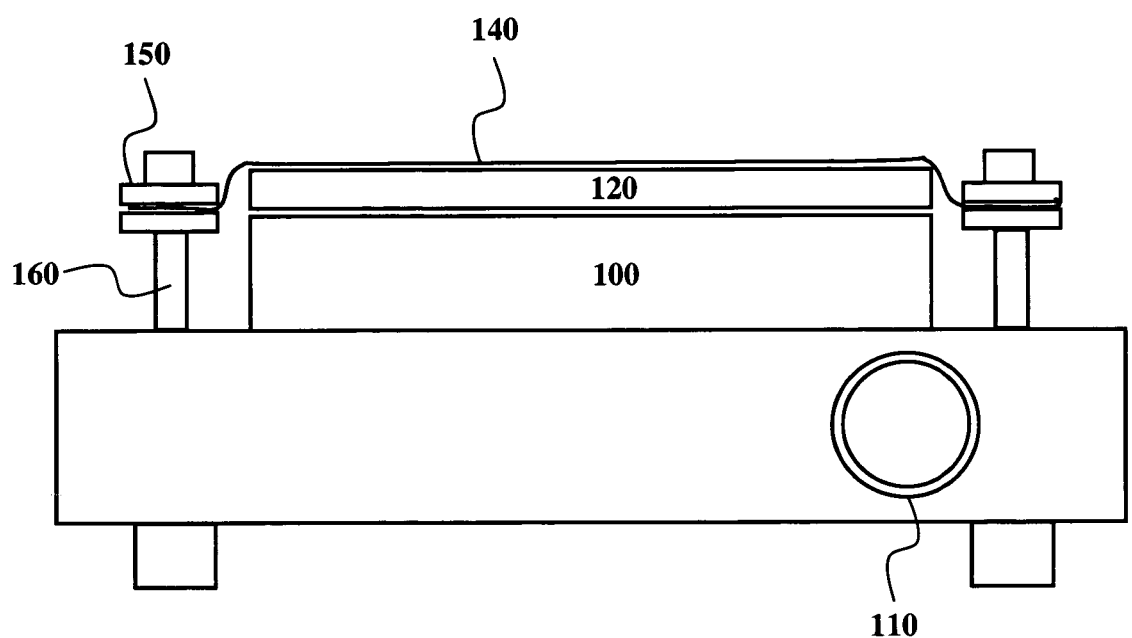
FIG. 4 is a side-view of a preferred embodiment of a picture pancake maker according to the present invention.
Figure 5:
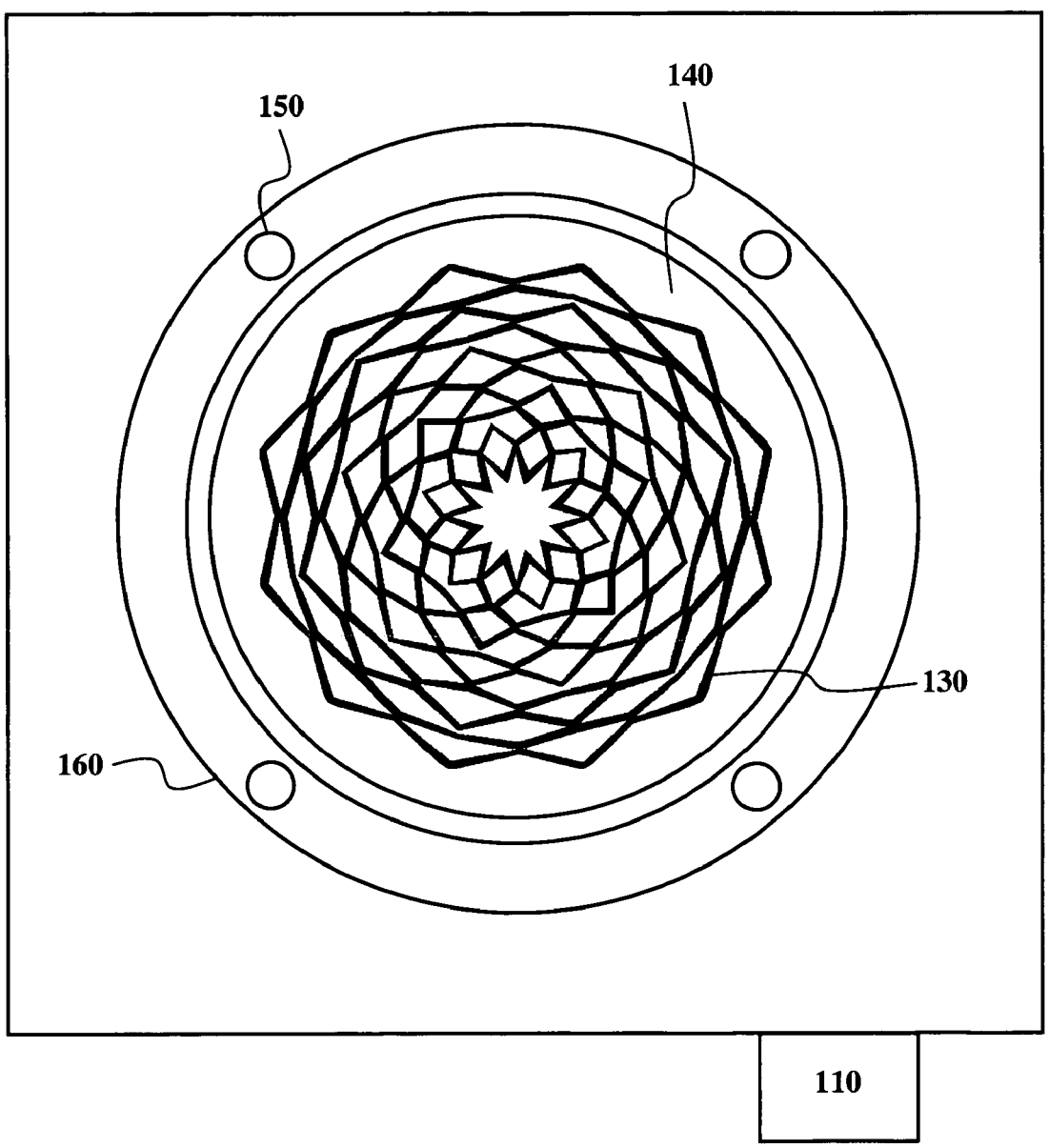
FIG. 5 is a top-view of a preferred embodiment of a picture pancake maker according to the present invention.

Referring now to FIGS. 4 and 5 the preferred embodiment of the picture pancake maker according to the present invention includes a heater 100, a cooking surface comprising a thermal conductivity mask 120, and thin film, 140, and a tension ring comprising a holding ring 150 and a tension mounts 160.

The heater 100, is typically electric but may be based on wood, gas, coal, oil, microwave, infrared, visible, ultraviolet, solar, laser, virtually any energy source capable of providing sufficient energy to produce a pattern. The heater 100 may include an adjustment control 110, that provides temperature control, it may also include an indicator light, not shown, to indicate when the pattern is complete. The indicator light may be driven by an electronic circuit including a temperature sensor and a timer to provide an accurate measure of the heat energy provided to the cooking surface.

The mask, 120, heated by the heater, 100, is typically a metal plate having high thermal conductivity (for example copper at ~3.85 Watts/($cm^2$ deg.C./cm) or aluminum at ~2.0 Watts/($cm^2$ deg.C./cm)) with a size equal to or greater than the size of the desired patterned region on the food item and a thickness in the range 0.00001" to 1", but in the preferred embodiment the mask plate thickness is approximately 0.1". The mask may be round in shape or have any shape suitable to the desired pattern.

In the preferred embodiment the thermal conductivity mask is patterned with features that include holes, depressions, cavities, bumps and/or openings that form a decorative picture, 130. The pattern 130 can be produced by any of a wide variety of methods including drilling, carving, engraving, sand blasting, machining, electro-chemical etching, photo-chemical etching with a photoresist to remove material in selected regions, by casting with a die or mold, by stamping with a metal press, by filling in regions of the mask with a thermally conductive compound, by enamelling, firing in a hearth or oven, painting, air-brushing, stenciling a patterning on a substrate that may be flat or have a pre-existing pattern of holes and/or openings. The size of the feature in the mask can range from 1 $nm^3$ up to and including the size of the entire mask plate. In one embodiment the minimum feature diameter is 0.03" as discussed previously with reference to FIG. 3.

The production method of the mask 120, can be selected to provide sufficient pattern detail and low-cost so that multiple mask plates with a variety of patterns can be provided to the consumer to be used interchangeably with one heater. Further the mask 120 may be patterned with features on one or both sides. Double sided masks increase the variety of patterns available to the consumer at low cost. In this way, the consumer can conveniently select from a variety of patterns according to personal preference or as the occasion demands.

The surface finish of the mask 120 can be selected to be highly reflective (polished) or more rough depending on whether the mask will be used in a radiative or conductive application. The mask may be flat or have a slight bow or dome shape to provide for good, uniform thermal and mechanical contact to the thin film that is stretched over its surface. The edges of the mask are generally rounded to avoid damaging the thin film, 140 stretched over its surface. The mask may be bonded to a support plate to provide mechanical strength and to increase the lateral thermal conductivity and improve the temperature uniformity over the entire mask area.

The decorative pattern 130 may be any type of drawing, sketch, symbol, character, text, logo, photograph (color or black & white, analog or digital), lithograph, still frame (i.e. from a moving picture), poster, advertisement, notice, news item, report, document, original work of art, reproduced work of art, marketing statement, mission statement, statement in celebration. The pattern may have meaning (religious, political, seasonal, commercial, to mark a special occasion or event), convey information (news, notice, report) or simply provide visual enhancement and/or entertainment.

The mask (patterned plate) 120 is shown in FIG. 5 with a geometric pattern reminiscent of a snow-flake. However, the list of examples is clearly infinite and endless. Here are some specific examples:

1. Snow-flake, flower, fruit, vegetable, various food-related items.

2. Animals such as dragons, unicorns, dogs, cats, mice, elephants, etc.

3. Holiday patterns, for example, Valentine's Day (arrow through heart), Birthday (name and personal message), wedding, memorial day, July 4 (flag, fireworks, anthem), Easter, Thanksgiving, Christmas, Hannukah, bar/bat mitzvah, Mardi gras, Cinco de mayo, Rammadan, New Year.

4. Religious symbols or icons to be used, for example, at a church breakfast, marketing graphics (including logo) for a company sponsored event, political symbols and patterns (Democratic, Republican, Capitalist, Socialist, Communist), Sports graphics (football, baseball, hockey, tennis, golf, etc).

5. Astronomical symbols such as the sun, moon, stars, planets, horoscopes, stellar signs.

6. Characters for the entertainment of children, including comic book characters, cartoon characters from televised children's programs, feature length movies, games, toys etc.: Superman, Spiderman, Mutant Ninja Turtles, Sponge Bob Square Pants, Pokemon, the Cat in the Hat, Bob the Builder, Shrek, Mickey Mouse, Porky Pig, Donald Duck, Snoopy and so on.

The term "decorative pattern" includes any image that would not normally occur without a thermal flux mask. This includes the various patterns listed above in addition to tonal scale images such as photographs.

The thin film, 140 may be a polytetrafluoroethylene film with a thickness in the range 0.000001" to 1.0", in the preferred embodiment the thin film thickness is approximately 0.001". The thin film is a convenient non-stick surface that serves to support the pancake batter over and in close contact with a surface of the heated mask. The thin film 140, will expand when the temperature rises from room temperature to the operating temperature and it is necessary to keep the film in close contact with the mask 120, free of wrinkles.

In the preferred embodiment, a tension ring 150 is attached to the heater with spring-loaded mounts 160, to keep the thin film 140, under tension and provide a smooth, uniform cooking surface over the full range from room (or ambient) temperature, typically in the range 30 to 100 deg. F., to the operating temperature, in the range 100–1000 deg. F. and typically 350–600 deg. F. The tension ring 150 is typically a metal ring that can clamp the thin film 140 and hold it in tension over the mask 120. The tension ring mount 160 is typically spring-loaded and holds the tension ring to keep the film smooth and uniform over the cooking temperature range.

The tension ring 150 helps minimize wrinkles and bubbles in the thin film 140 as the temperature increases from ambient temperature to the operating temperature. Thus, the tension ring 150 helps to overcome the difference in thermal expansion coefficients of the thin film material and the mask material. In the case of Teflon, the thermal expansion coefficient is typically 55×10−6 in/in/deg. F. For aluminum and its alloys the thermal expansion coefficient is typically in the range 11.7–13.7×10−6 in/in/deg. F. Thus in this case, the thin film 140 thermal expansion coefficient is more than 4× greater than the mask 120. For copper the expansion coefficient is typically in the range 7.7–9.8×10−6 in/in/deg. F., an even greater difference.

A further advantage of the tension ring 150 is improved reliability. The thin film 140 will wear out with extended use. It can also be easily damaged by scraping with metal utensils such as knives and forks. Use of the tension ring 150 provides for easy replacement of a worn or damaged thin film 140.

Figure 6:
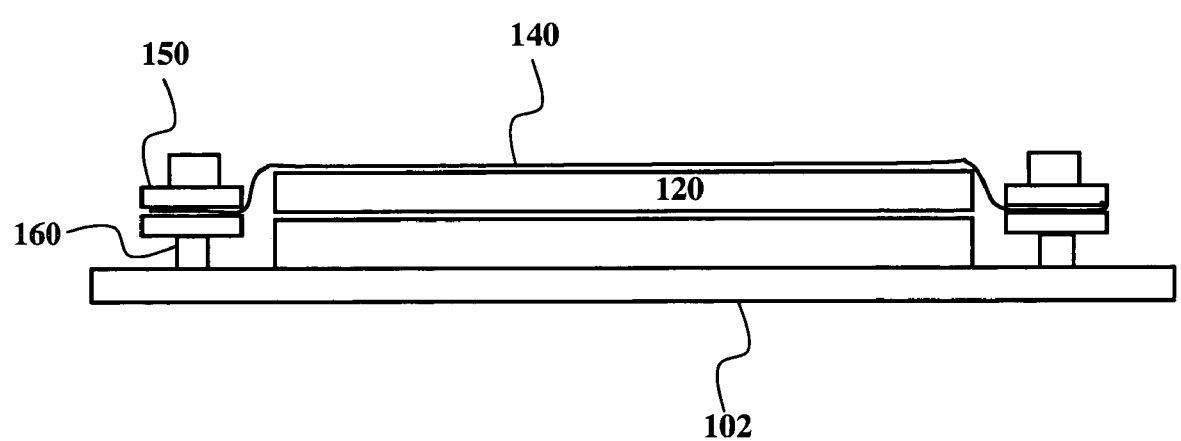
FIG. 6 is a side-view of an alternate embodiment where the picture pancake maker operates on an existing electric or gas element of a stove.

FIG. 6 shows an alternate embodiment of the thermal conductivity mask according to the present invention where the heater 100 is replaced by a support 102 that rides on a pre-existing heat source, for example an electric or gas range, a grill, an oven, a broiler, a wood-burning stove and so on. The remaining components are similar to FIG. 4 and 5, and include the cooking surface comprising a thermal conductivity mask 120, and thin film, 140, and a tension ring comprising a holding ring 150 and a tension mounts 160.

Figure 7B:
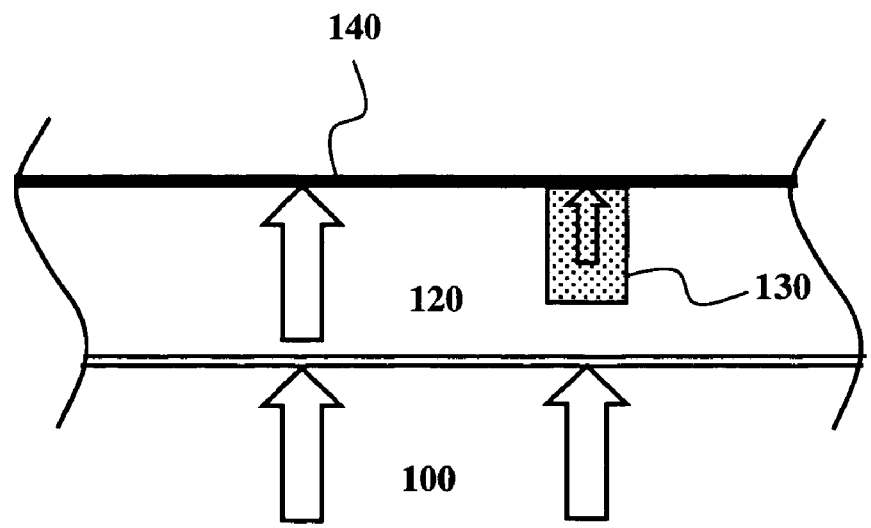
Figure 7C:
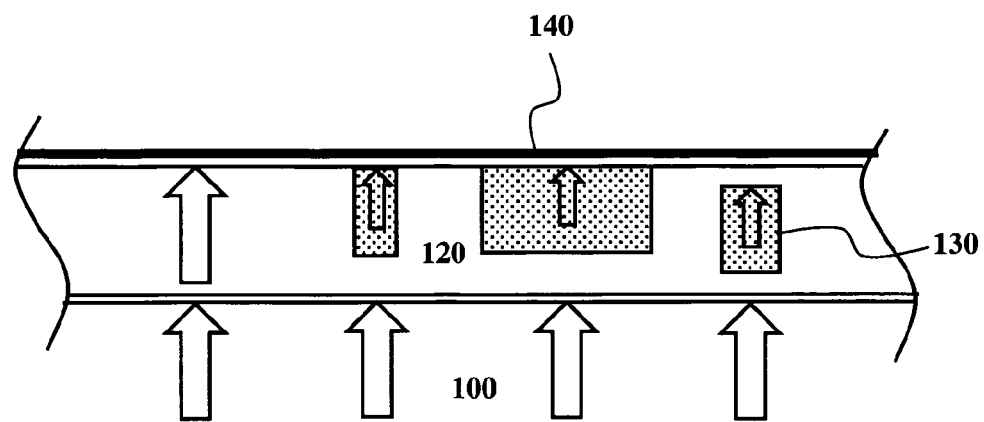
Figure 7D:
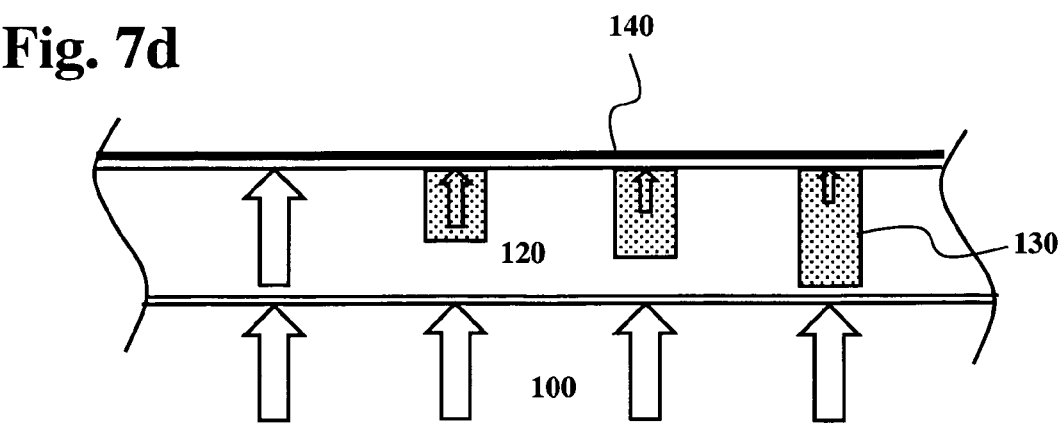

Further alternate embodiments replace the air cavity with another material having low thermal conductivity as discussed previously and shown in FIG. 7a. Although, in the preferred embodiment the thin film is held in tension and stretched over the mask, in an alternate embodiment shown in FIG. 7b, the thin film may instead be bonded directly to the mask. Bonding of polytetrafluoroethylene to metal cooking surfaces is well known in the prior art. Direct bonding the thin film to the mask 120, eliminates the small air-space between mask and thin film, improving uniformity and thermal conductivity from the heater 100, to the thin film 140. In addition, direct bonding permits reduced thin film thickness, leading to improved pattern quality. FIG. 7c, simply illustrates that cavities 130 may have a variety of shapes, sizes and positions within the mask. In addition, FIG. 7d shows cavities 130 with a range of depths, from shallow to deep. In general the depth of a cavity 130 may range from 0.000001" to the full thickness of the mask 120.

The size of the arrows in FIG. 7d indicates the rate of heat flow through the various cavities 130. Thus, as the depth of the cavity 130 increases the rate of heat flow decreases. The depth of the cavity 130 (in addition to the material filling the cavity) can be used to control the thermal conductance. A short cavity 130 has higher thermal conductance and will produce a darker color than a deep cavity 130 with low thermal conductance. By selecting the cavity depth, it is then possible to produce a full grey-scale ranging from dark to light and including all shades in between. In this way not just lines, but also shading may be included in the patterns produced by the thermal conductivity mask.

If the cavities 130 are small enough, they are similar to pixels in an image. A closely spaced array of cavities 130 can produce a picture just as an array of pixels produces a picture. The depth of the cavity 130 can control the gray level in the pattern, equivalent to the brightness of a pixel.

In a further alternate embodiment of the invention, cavities 130 may also be used to produce images by a technique known as halftone imaging. In this case the cavity 130 is similar to the dot used to produce conventional halftone images, as described below.

A continuous grey scale or tone image can be printed using dot patterns placed into the image to create what is referred to as a halftone image. By using dots of different sizes, a continuous range of color can be generated. This continuous range can be described in terms of three levels:
 1. Highlight, whites: Dots 5% to 10% in size
 2. Midtone, medium: Dots 30% to 70% in size
 3. Shadow, dark: Dots 90% to 95% in size Line screen, line frequency, screen frequency, or screen ruling are terms applied to the lines of dots in the halftone screens which can be used to create the image that is printed. A line screen contains a designated number of lines per inch (lpi) comprised of dots, which are used to create the print resolution of the desired image. "Dots" has become the generic term applied to all of the dot structures used to create the halftone, regardless of whether the dot shape is square or grain texture. The dot structures that are used to make halftones include:
 1. Square dot structure: conventional or traditional dot structure
 2. Elliptical dot structure: also called chain dots which provide smoother appearing middle tones
 3. Round dot structure: may cause loss of detail allows for improved control over dot gain in lighter middle tones
 4. Dual dot structure: most often used for work requiring output of fine detail, often used as a secondary ruling for the middle tones and shadows
 5. Cross line structure: may be used as a special effect screen
 6. Cut line structure: special effect screen providing jagged or rough edge effect
 7. Brick structure: can be used as a special effect screen
 8. Grain structure: a textured pattern for special image effects Typical line screens for printing presses designed to produce newspapers, magazines and periodicals have rulings from 65 lines per inch to 200 lines per inch. The number of shades of gray in an image is determined by the size of the halftone cell in the line screen and the size of the halftone dot. Screens with fewer lines per inch, for example 65, provide larger halftone cells while screens with a greater number of lines per inch provide smaller halftone cells. It is the halftone cell which holds and controls the size of the halftone dot. Large cells provide larger dots, which means there are fewer dots per inch, resulting in a coarse image. Smaller cells provide smaller dots, which means there are more dots per inch, resulting in more detail in the tonal color values.

Traditional line screens are referred to as amplitude-modulated (AM) screens having dots which vary in size, according to the number of lines per inch, and are aligned in columns and rows. Larger dots provide darker shades while smaller dots produce lighter shades in the entire image. An alternative screen method is referred to as frequency-modulated (FM) or stochastic screening, which has dots all the same size but scattered randomly throughout the screen. The greater the number of dots, the darker the shading, while fewer dots result in lighter shading. It is the dot size or placement in halftone screening, which provides different shades of colors within the image. FM screens are valued for their ability to provide finer image detail through the use of smaller dots and the elimination of moire patterns which can occur if traditional (AM) screens are used and misaligned with other screens. The disadvantage of FM screens, however, is the resulting fuzzy appearance of solid colors and some vector images when printed.

As the number of lines increases on the screen, the halftone dots are smaller and more numerous which will allow for more dots per inch. More halftone dots per inch adds greater detail to the image however, it will decrease the number of gray levels or color tones that can be provided. Continuous tone images contain unlimited levels of gray, which provide tonal resolution or depth to the image. Tonal resolution, also referred to as bit depth, measures the number of bits of color or grayscale information that can be recorded per pixel. The greater the bit depth, the greater the file size, since the computer records data on each pixel. Digital devices, such as cameras, scanners, or computers typically capture and display a limited number of gray shades. For example, an 8-bit gray scale allows the image to contain the maximum of 254 shades or levels of gray per channel with black and white added for a total of 256 different tones.

The number of shades or levels of gray (grayscale) is determined by the selected line screen (lpi or lines per inch) and the output resolution (dpi or dots per inch). A grayscale is a strip of gray tones (from white to black) used as a gauge to be placed next to the original or reproduced image in order to compare the balance of the process colors, measuring the tonal range and contrast of the image.

To increase the tone or shades of gray, use a line screen with fewer lines per inch, which increases the size of the halftone dots. With an increase in the lines per inch, which increases the number of smaller dots in the line screen, there is a corresponding increase in the detail within the image but a decrease in the shades of gray. The calculation below illustrates how to calculate the effect of increasing or decreasing the lines per inch. If there are only 50 to 100 shades of gray displayed, then the image will appear darker. To calculate the total shades of gray to be output in the image:

Total shades of gray=(printer resolution (dpi)/line screen frequency (lpi))^2+1

Number of dots=printer resolution. For example, a laser printer at 600 dots per inch (600 dpi)

Number of halftone cells=image resolution i.e., printer halftone screen frequency in lines per inch (e.g., 85 lpi)

EXAMPLES 1. 600 dpi: (600/85)^2+1=50 gray levels    1.

2. 720 dpi: (720/85)^2+1=72 gray levels    2.

3. 1440 dpi: (1440/85)^2+1=288 gray levels    3.

The methods of the invention may be extended to produce patterns with multiple colors, for example by use of temperature sensitive edible dyes.

What is claimed is:

1. A device, comprising:
a masking layer;
a thermal transfer layer, the thermal transfer layer proximate the masking layer, and
at least one cavity bounded by the masking layer and the thermal transfer layer,
where the device selectively applies a thermal flux to a target,
where the masking layer determines the selective application of the thermal flux.

2. The device of claim 1, further comprising a heating element layer, the heating element layer proximate the masking layer.

3. The device of claim 2, further comprising an adjustable temperature control.

4. The device of claim 1, further comprising a temperature indicator light, the temperature indicator light indicating that the system has reached its operating temperature.

5. The device of claim 1, further comprising a process complete indicator light, the process complete light indicating that the system has finished processing the target.

6. The device of claim 5, further comprising a temperature sensor, a timer, and logic that determines when an appropriate amount of thermal transfer has been achieved.

7. The device of claim 1, where the target is a food product.

8. The device of claim 7, where the target is a pancake.

9. The device of claim 1, where the selectively applied thermal flux produces a decorative pattern on the target.

10. The device of claim 1, where the selectively applied thermal flux produces an image on the target.

11. The device of claim 1, where heat is applied to the masking layer with an external heat source.

12. The device of claim 1, where the masking layer includes at least one void.

13. The device of claim 12, where the at least one void is filled with a gas.

14. The device of claim 12, where the at least one void is filled with a thermally insulating material.

15. The device of claim 12, where the at least one void is a vacuum.

16. The device of claim 1, where the masking layer can be separated from an external heat source.

17. The device of claim 1, where the masking layer is permanently attached to a heating element layer.

18. The device of claim 1, where the thermal transfer layer is permanently attached to the masking layer.

19. The device of claim 1, where the thermal transfer layer is non-stick.

20. The device of claim 19, where the thermal transfer layer comprises polytetrafluoroethylene.

21. The device of claim 1, where the thermal transfer layer operates at a temperature in the range of 100 to 1000 degrees F.

22. The device of claim 21, where the thermal transfer layer operates at a temperature in the range of 350 to 600 degrees F.

23. The device of claim 1, where the masking layer comprises a material with high thermal conductivity.

24. The device of claim 23, where the masking layer comprises copper.

25. The device of claim 23, where the masking layer comprises aluminum.

26. The device of claim 1, further comprising a tension ring and spring loaded mounts, the ring and mounts providing tension on the thermal transfer layer.

27. The device of claim 1, where the masking layer determines the selective application of the thermal flux by selectively reflecting or absorbing radiation energy from a remote heat source, and where the masking layer transfers absorbed energy to the thermal transfer layer.

28. A method of selectively applying a thermal flux comprising:
- applying a thermal flow to a masking layer;
- selectively applying the thermal flow from the masking layer to a thermal transfer layer, wherein at least one cavity is bounded by the masking layer and the thermal layer, and;
- applying the selected thermal flow from the thermal transfer layer to a target.

29. The device of claim 28, where the target is a food product.

30. The device of claim 29, where the target is a pancake.

31. The device of claim 28, where the selectively applied thermal flux produces a decorative pattern on the target.

32. A cooking device, comprising:
- a masking layer;
- a thermal transfer layer, the thermal transfer layer proximate the masking layer, the thermal transfer layer comprising polytetrafluoroethylene;
- a heating element layer, the heating element layer proximate the masking layer;
- an adjustable temperature control;
- a temperature indicator light, the temperature indicator light indicating that the system has reached its operating temperature;
- a process complete indicator light, the process complete light indicating that the system has finished processing the target;
- a temperature sensor;
- a timer;
- logic that determines when an appropriate amount of thermal transfer has been achieved;
- a tension ring; and
- spring loaded mounts, the tension ring and mounts providing tension on the thermal transfer layer, where the masking layer includes at least one void, where the device selectively applies a thermal flux to a target, where the masking layer determines the selective application of the thermal flux, where the thermal transfer layer operates at a temperature in the range of 350 to 600 degrees F., where the masking layer comprises a material with high thermal conductivity.

* * * * *